(12) United States Patent
Yamada

(10) Patent No.: US 10,344,174 B2
(45) Date of Patent: Jul. 9, 2019

(54) INK JET PRINTING INK COMPOSITION AND INK JET PRINTING METHOD

(71) Applicant: Seiko Epson Corporation, Tokyo (JP)

(72) Inventor: Minoru Yamada, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/830,292

(22) Filed: Dec. 4, 2017

(65) Prior Publication Data

US 2018/0237647 A1 Aug. 23, 2018

(30) Foreign Application Priority Data

Feb. 17, 2017 (JP) .................. 2017-027770

(51) Int. Cl.
| | |
|---|---|
| *C09D 11/322* | (2014.01) |
| *C09D 11/102* | (2014.01) |
| *B41J 2/01* | (2006.01) |
| *B41J 3/407* | (2006.01) |
| *C09D 11/36* | (2014.01) |
| *C09D 11/10* | (2014.01) |

(52) U.S. Cl.
CPC ............... *C09D 11/322* (2013.01); *B41J 2/01* (2013.01); *B41J 3/4078* (2013.01); *C09D 11/10* (2013.01); *C09D 11/102* (2013.01); *C09D 11/36* (2013.01)

(58) Field of Classification Search
CPC ....... C09D 11/322; C09D 11/30; C09D 11/10; C09D 11/54; D06P 1/44; D06P 5/30; B41J 2/01
See application file for complete search history.

(56) References Cited

U.S. PATENT DOCUMENTS

| | | | |
|---|---|---|---|
| 8,608,306 B2 * | 12/2013 | Kojima ................. | B82Y 30/00 347/100 |
| 2010/0214352 A1 | 8/2010 | Tsunoda et al. | |
| 2012/0194621 A1 * | 8/2012 | Ikegami ..................... | B41J 2/15 347/100 |
| 2018/0237647 A1 * | 8/2018 | Yamada ............... | C09D 11/322 |

FOREIGN PATENT DOCUMENTS

JP 2009-096914 A 5/2009

* cited by examiner

*Primary Examiner* — Huan H Tran
(74) *Attorney, Agent, or Firm* — Harness, Dickey & Pierce, P.L.C.

(57) ABSTRACT

An ink jet printing ink composition contains pigment particles, resin particles, and water, in which the particle diameter ratio of the average particle diameter of the resin particles to the average particle diameter of the pigment particles is 0.60 or more and 1.70 or less and the potential ratio of the zeta potential of the resin particles to the zeta potential of the pigment particles is 0.80 or more and 1.25 or less.

20 Claims, 1 Drawing Sheet

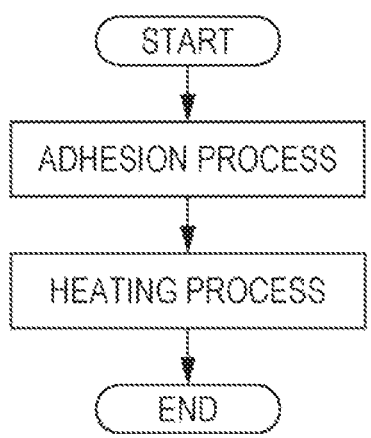

INK JET PRINTING INK COMPOSITION AND INK JET PRINTING METHOD

BACKGROUND

1. Technical Field

The present invention relates to an ink jet printing ink composition and an ink jet printing method.

2. Related Art

An ink jet recording method enables recording of a high definition image with a relatively simple apparatus and has rapidly developed in various fields. In the development, various examinations have been made for more stably obtaining high quality recorded matter.

For example, JP-A-2009-96914 aims at providing a printing ink jet ink which has good washing fastness and friction fastness, which can realize good concealing properties when used for deep color cloth, and which is excellent also in stability on a machine and a method for manufacturing a printed product using the same, and discloses a printing ink jet ink containing a pigment, a water-dispersible resin, water, and a water-soluble organic solvent, in which the printing ink jet ink contains polyol having an SP value of 10 to 15.5 $(cal/cm^3)^{1/2}$ as the water-soluble organic solvent and a urethane resin having a glass transition point of −35 to 10° C. as the water-dispersible resin.

Herein, with respect to a former ink composition disclosed in JP-A-2009-96914 for use in a printing method using an ink jet method, when the ink composition is caused to adhere to a target recording medium containing cloth, the friction fastness of a printed product to be obtained is not sufficiently excellent.

SUMMARY

Then, the invention has been made in order to at least partially solve the above-described problems. An advantage of some aspects of the invention is to provide an ink jet printing ink composition capable of obtaining a printed product excellent in friction fastness.

The present inventors have conducted an extensive examination in order to solve the above-described problems. As a result, the present inventors have found that a printed product excellent in friction fastness can be obtained by using an ink jet printing ink composition containing pigment particles, resin particles, and water, in which the particle diameter ratio of the average particle diameter of the resin particles to the average particle diameter of the pigment particles is within a predetermined range and the potential ratio of the zeta potential of the resin particles to the zeta potential of the pigment particles is within a predetermined range, and thus have completed the invention.

More specifically, according to an aspect of the invention, an ink jet printing ink composition contains pigment particles, resin particles, and water, in which the particle diameter ratio of the average particle diameter of the resin particles to the average particle diameter of the pigment particles is 0.60 or more and 1.70 or less and the potential ratio of the zeta potential of the resin particles to the zeta potential of the pigment particles is 0.80 or more and 1.25 or less. It is considered that the factor that such an ink composition can solve the above-descried problems of the invention is as follows. However, the factor is not limited thereto. More specifically, in the ink jet printing ink composition according to the aspect of the invention, mainly due to the fact that the particle diameter ratio of the average particle diameter of the resin particles to the average particle diameter of the pigment particles is 0.60 or more and 1.70 or less and the potential ratio of the zeta potential of the resin particles to the zeta potential of pigment particles is 0.80 or more and 1.25 or less, and therefore, in a process where the ink jet printing ink composition is caused to adhere to a target recording medium containing cloth, and then the ink jet printing ink composition is dried to be solidified on the target recording medium, a state where the pigment particles and the resin particles are uniformly mixed is maintained from a state where the pigment particles and the resin particles are uniformly dispersed and a coating film in which the ink jet printing ink composition is solidified to be formed into a coating film is obtained, the strength of the coating film improves, so that a printed product excellent in friction fastness can be obtained.

Moreover, it is preferable that, in the ink jet printing ink composition according to the aspect of the invention, the Young's modulus of a coating film obtained by drying the ink jet printing ink composition is 0.5 MPa or more and 30 MPa or less and the fracture elongation thereof is 300% or more and 1200% or less. It is preferable that, in the ink jet printing ink composition according to the aspect of the invention, the surface tension is 20 mN/m or more and 50 mN/m or less and the viscosity is 5.0 mPa·s or more and 25 mPa·s or less. It is preferable that, in the ink jet printing ink composition according to the aspect of the invention, the resin particles contain 1.0 part by mass or more and 5.0 parts by mass or less of a urethane-based resin based on 1.0 part by mass of the pigment particles. It is preferable for the ink jet printing ink composition according to the aspect of the invention to further contain a crosslinking agent, in which the crosslinking agent contains 0.04 part by mass or more and 1.0 part by mass or less of a block isocyanate-based compound based on 1.0 part by mass of the pigment particles. It is preferable for the ink jet printing ink composition according to the aspect of the invention to further contain a lubricant, in which the lubricant contains 0.05 part by mass or more and 1.0 part by mass or less of a polyethylene-based compound based on 1.0 part by mass of the pigment particles. It is preferable that, in the ink jet printing ink composition according to the aspect of the invention, the content of the resin particles is 5.0% by mass or more and 20% by mass or less based on the total amount of the ink jet printing ink composition. It is preferable that, in the ink jet printing ink composition according to the aspect of the invention, the content of the pigment particles is 1.0% by mass or more and 15% by mass or less based on the total amount of the ink jet printing ink composition. It is preferable that, in the ink jet printing ink composition according to the aspect of the invention, the average particle diameter of the pigment particles and the average particle diameter of the resin particles each independently are 50 nm or more and 300 nm or less. It is preferable that, in the ink jet printing ink composition according to the aspect of the invention, the zeta potential of the pigment particles and the zeta potential of the resin particles each independently are 40 mV or more in terms of an absolute value and mutually have the same sign. It is preferable for the ink jet printing ink composition according to the aspect of the invention to further contain an organic solvent, in which the organic solvent contains one or two or more kinds selected from the group consisting of an alkyldiol compound having 2 to 6 carbon atoms and an alkyltriol compound having 2 to 6 carbon atoms except glycerol. It is preferable that, in the ink jet printing ink composition according to the aspect of the invention, the particle diameter ratio of the average particle diameter of the resin particles to the average particle diameter of the pigment particles is 0.60 or more and 0.90 or less.

Furthermore, an ink jet printing method according to an aspect of the invention has a process of causing the ink composition according to the aspect of the invention to adhere onto a target recording medium containing cloth.

BRIEF DESCRIPTION OF THE DRAWINGS

The invention will be described with reference to the accompanying drawing, wherein like numbers reference like elements.

FIGURE is a flow chart illustrating an example of a printing method of this embodiment.

DESCRIPTION OF EXEMPLARY EMBODIMENTS

Hereinafter, an embodiment of the invention (hereinafter referred to as "this embodiment") is described in detail with reference to the drawings as necessary but the invention is not limited thereto and can be variously modified without deviating from the scope. In this specification, "(meth) acrylic resin" means both acrylic resin and methacrylic resin corresponding thereto.

In this specification, "printing" refers to recording (printing) an ink on a target recording medium containing cloth. The "ink jet printing" refers to recording (printing) an ink on a target recording medium containing cloth using an ink jet system and is one kind of ink jet recording. A "printed product" refers to one in which an image is formed on a target recording medium containing cloth by recording of an ink.

Ink Jet Printing Ink Composition

An ink jet printing ink composition (hereinafter simply also referred to as an "ink composition") of this embodiment contains pigment particles, resin particles, and water, in which the particle diameter ratio of the average particle diameter of the resin particles to the average particle diameter of the pigment particles is 0.60 or more and 1.70 or less and the potential ratio of the zeta potential of the resin particles to the zeta potential of the pigment particles is 0.80 or more and 1.25 or less. It is considered that the factor that such an ink composition can provide a printed product excellent in friction fastness is as follows. However, the factor is not limited thereto. More specifically, in the ink jet printing ink composition according to this embodiment, mainly due to the fact that the particle diameter ratio of the average particle diameter of the resin particles to the average particle diameter of the pigment particles is 0.60 or more and 1.70 or less and the potential ratio of the zeta potential of the resin particles to the zeta potential of pigment particles is 0.80 or more and 1.25 or less, and therefore, in a process where the ink jet printing ink composition is caused to adhere to a target recording medium containing cloth, and then the ink jet printing ink composition is dried to be solidified on the target recording medium, a state where the pigment particles and the resin particles are uniformly mixed is maintained from a state where the pigment particles and the resin particles are uniformly dispersed and a coating film in which the ink jet printing ink composition is solidified to be formed into a coating film is obtained, the strength of the coating film improves, so that a printed product excellent in friction fastness can be obtained. Moreover, the ink jet printing ink composition of this embodiment is excellent in discharge stability and storage stability. Furthermore, the ink jet printing ink composition of this embodiment is also excellent in color development properties due to the fact that, when adhering to a target recording medium containing cloth, solvent components, such as water, contained in the ink jet printing ink composition permeate into the cloth.

Although the surface tension of the ink composition is not particularly limited and is preferably 20 mN/m or more and 50 mN/m or less, more preferably 25 mN/m or more and 45 mN/m or less, still more preferably 30 mN/m or more and 43 mN/m or less, yet still more preferably 35 mN/m or more and 43 mN/m or less, and even yet still more preferably 40 mN/m or more and 43 mN/m or less. Due to the fact that the surface tension of the ink composition is within the ranges mentioned above, there is a tendency that a printed product more excellent in friction fastness can be obtained.

The viscosity of the ink composition is not particularly limited and is preferably 3.0 mPa·s or more and 28.0 mPa·s or less, more preferably 5.0 mPa·s or more and 25 mPa·s or less, still more preferably 7.0 mPa·s or more and 20 mPa·s or less, yet still more preferably 7.0 mPa·s or more 15 mPa·s or less, and even yet still more preferably 7.0 mPa·s or more and 10 mPa·s or less. Due to the fact that the viscosity of the ink composition is within the ranges mentioned above, there is a tendency that the discharge stability and the storage stability are more excellent. The viscosity of the ink composition is measured according to a method described in Examples.

It is more preferable that the surface tension of the ink composition is 20 mN/m or more and 50 mN/m or less and the viscosity of the ink composition is 3.0 mPa·s or more and 28 mPa·s or less. Due to the fact that the surface tension and the viscosity of the ink composition are within the ranges mentioned above, there is a tendency that the discharge stability and the storage stability are more excellent and there is a tendency that a printed product more excellent in friction fastness can be obtained. The surface tension of the ink composition is measured according to a method described in Examples.

The Young's modulus of the coating film in which the ink composition is dried is not particularly limited and is preferably 0.5 MPa or more and 30 MPa or less, more preferably 1.0 MPa or more and 25 MPa or less, still more preferably 1.0 MPa or more and 20 MPa or less, and yet still more preferably 1.0 MPa or more and 10 MPa or less. Due to the fact that the Young's modulus of the coating film is within the range mentioned above, there is a tendency that a printed product more excellent in friction fastness can be obtained. The Young's modulus of the coating film is measured according to a method described in Examples.

The fracture elongation of the coating film in which the ink composition is dried is not particularly limited and is preferably 300% or more and 1200% or less, more preferably 400% or more and 1000% or less, still more preferably 400% or more and 800% or less, and particularly preferably 600% or more and 700% or less. Due to the fact that the fracture elongation of the coating film is within the ranges mentioned above, there is a tendency that a printed product more excellent in friction fastness can be obtained. The fracture elongation of a coating film is measured according to a method described in Examples.

It is more preferable that the Young's modulus of the coating film in which the ink composition is dried is 0.5 MPa or more and 30 MPa or less and the fracture elongation is 300% or more and 1200% or less. Due to the fact that the Young's modulus and the fracture elongation of the coating film are within the ranges mentioned above, there is a tendency that a printed product more excellent in friction fastness can be obtained.

The coating film in which the ink composition is dried as used herein means a film obtained by drying the ink composition. As a specific example of the coating film, a frame having a height sufficient for the formation of a rectangular hollow in which the size of an opening portion is 3×19 cm is provided on a flat base material, such as metal or glass, and then 10 g of the ink composition is placed in the frame, followed by drying under the atmosphere overnight. Thereafter, the resultant substance is heated at 160° C. for 15 minutes. Then, an ink coating film is obtained from a base material by peeling. More specifically, the coating film can be produced by a method described in Examples described later.

Pigment Particles

The pigment particles of this embodiment are particles containing a pigment. Examples of the pigment include, but are not particularly limited to, the following substances, for example.

Examples of carbon black for use in a black ink include, but are not particularly limited to, Bonjetblack CW-1 (manufactured by Orient Chemical Industries Co., Ltd.), No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K K.), Color Black FW1, Color Black FW2, Color Black FW2V, Color Black FW18, Color Black FW200, Color Black 5150, Color B lack 5160, Color Black 5170, Printex 35, Printex U, Printex V, Printex 140U, Special Black 6, Special Black 5, Special Black 4A, and Special Black 4 (all manufactured by Degussa), for example.

Examples of the pigment for use in a white ink include, but are not particularly limited to, C.I. Pigment White 6, 18, and 21, titanium oxide, zinc oxide, zinc sulfide, antimony oxide, zirconium oxide, white hollow resin particles, and polymer particles, for example.

Examples of the pigment for use in a yellow ink include, but are not particularly limited to, EMACOL SF Yellow J701F (Trade Name, manufactured by Sanyo Color Works, LTD.), and C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, for example.

Example of the pigment for use in a magenta ink include, but are not particularly limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50, for example.

Examples of the pigment for use in a cyan ink include, but are not particularly limited to, C.I. Pigment Blue 1, 2, 3, 15, 15:1, 15:2, 15:3, 15:34, 15:4, 16, 18, 22, 25, 60, 65, and 66, C.I. Vat Blue 4 and 60, and C.I. Direct Blue 199, for example.

Examples of pigments other than the pigments mentioned above include, but are not particularly limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63, for example.

The average particle diameter of the pigment particles is preferably 50 nm or more and 300 nm or less, more preferably 55 nm or more and 200 nm or less, still more preferably 60 nm or more and 150 nm or less, and yet still more preferably 65 nm or more and 100 nm or less. Due to the fact that the average particle diameter of the pigment particles is within the ranges mentioned above, there is a tendency that the discharge stability and the storage stability are more excellent and there is a tendency that a printed product more excellent in friction fastness can be obtained.

The average particle diameter in this specification is on a volume basis unless otherwise clearly specified. As a measurement method, the average particle diameter can be measured by a particle size distribution meter employing a laser diffraction scattering method as the measurement principle, for example. As a particle size distribution meter, a particle size distribution meter (for example, Microtrac UPA manufactured by Nikkiso Co., Ltd.) employing a dynamic light scattering method as the measurement principle is mentioned, for example.

The Zeta ($\zeta$) potential of the pigment particles is preferably 40 mV or more, more preferably 45 mV or more and 80 mV or less, still more preferably 45 mV or more and 70 mV or less, and yet still more preferably 45 mV or more and 60 mV or less in terms of an absolute value. Due to the fact that the Zeta ($\zeta$) potential of the pigment particles is within the ranges mentioned above, there is a tendency that the discharge stability and the storage stability are more excellent and there is a tendency that a printed product more excellent in friction fastness can be obtained.

As a method for measuring the Zeta ($\zeta$) potential in this specification, the Zeta potential can be measured using a "Zetasizer 3000HS" of Malvern (U.K.), for example.

In the ink composition, the content of the pigment particles is preferably 1.0% by mass or more and 15% by mass or less, more preferably 2.0% by mass or more and 10% by mass or less, and still more preferably 3.0% by mass or more and 7.0% by mass or less based on the total amount (100% by mass) of the ink composition. Due to the fact that the content of the pigment particles is within the ranges mentioned above, there is a tendency that the discharge stability and the storage stability are more excellent.

Resin Particles

The resin particles of this embodiment (hereinafter also referred to as "resin dispersion" and "resin emulsion") are particles containing resin.

The resin particles of this embodiment may be resin particles of a self-dispersion type (self-dispersion type resin particles) into which a hydrophilic component required in order to be stably dispersed in water is introduced or may be resin particles which become water dispersible by the use of an external emulsifier. However, from the viewpoint of not inhibiting a reaction with a polyvalent metal compound which may be contained in a target recording medium described later, the resin particle is preferably a self-emulsifying type resin dispersion.

Examples of the resin include, for example, (meth)acrylic resin, styrene acrylic resin, fluorene-based resin, urethane-based resin, polyolefin-based resin, rosin-modified resin, terpene-based resin, polyester-based resin, polyamide-based resin, epoxy-based resin, vinyl chloride-based resin, a vinyl chloride-vinyl acetate copolymer, and ethylene vinyl acetate-based resin. The resin mentioned above may be used alone or in combination of two or more kinds thereof.

Among the above, since the degree of freedom in design is high, the resin is preferably one or two or more kinds selected from the group consisting of urethane-based resin and (meth)acrylic resin and more preferably contains a urethane-based resin.

The urethane-based resin is a resin having a urethane bond in the molecule. The urethane-based resin is preferably an anionic urethane-based resin having an anionic functional group, such as a carboxy group, a sulfo group, and a hydroxy group, from the viewpoint of the storage stability of an ink or increasing the reactivity with a polyvalent metal compound when the polyvalent metal compound is contained in a pretreatment agent described later.

Examples of the urethane-based resin include a polyether type urethane resin containing an ether bond in the main chain, a polyester type urethane resin containing an ester bond in the main chain, and a polycarbonate type urethane resin containing a carbonate bond in the main chain, besides a urethane bond. The urethane resin mentioned above can be used in combination of two or more kinds thereof.

Examples of commercially-available items of the urethane-based resin include UW-1501F and UW-5002 (all Trade Names, manufactured by Ube Industries, Ltd.), W-6061 and W-6110 (all Trade Names, manufactured by Mitsui Chemicals, Inc.), UX-150, UX-390, and UX-200 (all Trade Names, manufactured by Sanyo Chemical Industries, Ltd.).

The resin particles contain the urethane-based resin in a proportion of preferably 1.0% by mass or more and 5.0% by mass or less, more preferably 1.5% by mass or more and 4.2% by mass or less, still more preferably 2.0% by mass or more and 3.5% by mass or less, and yet still more preferably 2.5% by mass or more and 3.0% by mass or less based on 1.0 part by mass of the pigment particles contained in the ink composition described above. Due to the fact that the content of the urethane-based resin is within the ranges mentioned above, there is a tendency that a printed product more excellent in friction fastness can be obtained.

The (meth)acrylic resin means a resin having a (meth) acryl skeleton. Examples of the (meth)acrylic resin include, but are not particularly limited to, polymers of (meth)acrylic monomers, such as (meth)acrylic acid and (meth)acrylic ester, and copolymers of (meth)acrylic monomers and other monomers, for example. Examples of the other monomers include vinyl-based monomers, such as styrene. In this specification, "(meth)acryl" is a concept containing both "methacryl" and "acryl".

The weight average molecular weight of the resin contained in resin particles is preferably 10,000 or more, more preferably 20,000 or more, and still more preferably 20,000 or more and 100,000 or less. The weight average molecular weight can be measured and determined in terms of polystyrene using THF as a solvent and using gel permeation chromatography (GPC).

The average particle diameter of the resin particles is preferably 50 nm or more and 300 nm or less, more preferably 55 nm or more and 200 nm or less, still more preferably 60 nm or more and 150 nm or less, and yet still more preferably 65 nm or more and 100 nm or less. Due to the fact that the average particle diameter of the resin particles is within the ranges mentioned above, there is a tendency that the discharge stability and the storage stability are more excellent and there is a tendency that a printed product more excellent in friction fastness can be obtained.

The Zeta ($\zeta$) potential of the resin particles is preferably 40 mV or more, more preferably 45 mV or more and 80 mV or less, still more preferably 45 mV or more and 70 mV or less, and yet still more preferably 45 mV or more and 60 mV or less in terms of an absolute value. Due to the fact that the Zeta ($\zeta$) potential of the resin particles is within the ranges mentioned above, there is a tendency that the discharge stability and the storage stability are more excellent and there is a tendency that a printed product more excellent in friction fastness can be obtained.

The average particle diameter and the zeta potential of the resin particles each can be measured by the same measurement methods as those described as the measurement methods of the average particle diameter and the zeta potential of the pigment particles.

The particle diameter ratio of the average particle diameter of the resin particles to the average particle diameter of the pigment particles is 0.60 or more and 1.70 or less, preferably 0.61 or more and 1.25 or less, more preferably 0.62 or more and 1.00 or less, still more preferably 0.63 or more and 0.90 or less, and particularly preferably 0.65 or more and 0.80 or less. Due to the fact that the particle diameter ratio is within the ranges mentioned above, a printed product more excellent in discharge stability and storage stability and more excellent in friction fastness can be obtained. Moreover, a printed product more excellent in friction fastness can be obtained by sufficiently enclosing the space between relatively hard pigment particles with relatively elastic resin particles.

The potential ratio of the Zeta ($\zeta$) potential of the resin particles to the Zeta ($\zeta$) potential of the pigment particles is 0.80 or more and 1.25 or less, preferably 0.85 or more and 1.18 or less, more preferably 0.90 or more and 1.11 or less, still more preferably 0.95 or more and 1.05 or less, and particularly preferably 0.96 or more and 1.03 or less. Due to the fact that the potential ratio is within the ranges mentioned above, a printed product more excellent in discharge stability and storage stability and more excellent in friction fastness can be obtained. Moreover, when a coating film of the ink composition is dried to be solidified, the pigment particles and the resin particles can be present while being uniformly mixed to the end.

The Zeta ($\zeta$) potential of the pigment particles and the Zeta ($\zeta$) potential of the resin particles preferably have mutually the same sign. Due to the fact that the signs are mutually the same, there is a tendency that a printed product more excellent in friction fastness can be obtained. Herein, the "same sign" means that the Zeta ($\zeta$) potential values are mutually plus (+) or minus (−).

In the ink composition, the content (in terms of solid content) of the resin particles is preferably 5.0% by mass or more and 20% by mass or less, more preferably 7.0% by mass or more and 15% by mass or less, still more preferably 8.0% by mass or more and 13% by mass or less, and yet still more preferably 9.0% by mass or more and 10% by mass or less based on the total amount (100% by mass) of the ink composition. Due to the fact that the content of the resin particles is within the ranges mentioned above, there is a tendency that the discharge stability and the storage stability are more excellent and there is a tendency that a printed product more excellent in friction fastness can be obtained.

Hereinafter, methods for controlling the zeta potential and the average particle diameter of the resin particles and the zeta potential and the average particle diameter of the pigment particles are described in detail.

The zeta potential of the resin particles can be adjusted by adjusting the type of monomers to be used for the synthesis of resin and the mass ratio to be used therefor, for example. For example, the used ratio (mass ratio) of monomers having ionic functional groups, such as a carboxyl group, and monomers not having ionic functional groups may be adjusted. The zeta potential of the resin particles thus obtained may be measured, the zeta potential may be adjusted again based on the results, and then a desired resin may be obtained by synthesis. Moreover, commercially-available resin particles in which the zeta potential is known may be used. The zeta potential may be adjusted by a method capable of adjusting the zeta potential of the resin particles without being limited to the above-described method.

The average particle diameter of the resin particles can be adjusted by changing the monomer amount in a liquid phase, the reaction time, the stirring speed, and the type or the amount of an emulsifier made to be present in synthesizing resin or by adjusting the stirring speed/time, the amount of an emulsifier, and the like in a process of dispersing a resin, for example. The average particle diameter of the resin particles thus obtained may be measured, and then the average particle diameter may be adjusted again based on the results to obtain a desired dispersion liquid. Moreover, commercially-available resin particles in which the average particle diameter is known may be used. The average particle diameter may be adjusted by a method capable of adjusting the average particle diameter of the resin particles without being limited to the above-described method.

The zeta potential of the pigment particles can be adjusted by adjusting the mass ratio adjusting the degree of processing of introducing hydrophilicity groups, such as a carboxyl group, a sulfone group, and a phosphorus-containing group, into the surface of the pigment, for example. Specifically, the zeta potential may be adjusted by changing the temperature or the time, the type or the used amount of a surface treatment agent, and the like in surface treatment. The zeta potential of the resin particles thus obtained may be measured, and then the surface treatment may be performed again based on the results to obtain desired pigment particles. Moreover, commercially-available resin particles in which the zeta potential is known may be used. The zeta potential may be adjusted by a method capable of adjusting the zeta potential of the resin particles without being limited to the above-described method.

The average particle diameter of the pigment particles can be adjusted by adjusting the stirring speed/time, the amount and the type of a dispersant, and the like in a process of dispersing a pigment, for example. The average particle diameter of the resin particles thus obtained may be measured, and then the average particle diameter may be adjusted again based on the results to obtain a desired dispersion liquid. Moreover, commercially-available resin particles in which the average particle diameter is known may be used. The average particle diameter may be adjusted by a method capable of adjusting the average particle diameter of the resin particles without being limited to the above-described method.

Water

The ink composition of this embodiment contains water. Examples of water include pure water, such as ion exchanged water, ultrafiltration water, reverse osmosis water, and distilled water, and ultrapure water in which ionic impurities are removed as much as possible, for example. When water which is sterilized by irradiation with ultraviolet rays, addition of hydrogen peroxide, or the like is used, the generation of mold or bacteria can be prevented when an aggregation liquid is stored for a long period of time. Thus, the storage stability tends to further improve.

Organic Solvent

It is preferable for the ink composition of this embodiment to further contain an organic solvent. The organic solvent is not particularly limited insofar as the organic solvent can be used together with water.

Examples of the organic solvent type include, but are not particularly limited to, a cyclic nitrogen compound, an aprotic polar solvent, monoalcohol, alkylpolyol, and glycol ether, for example.

Examples of the aprotic polar solvent include, but are not particularly limited to, a cyclic ketone compound, a chain ketone compound, and a chain nitrogen compound, for example. As the cyclic nitrogen compound and the aprotic polar solvent, solvents of pyrrolidones, imidazolidinones, sulfoxides, lactones, amide ethers, and imidazoles are mentioned as typical examples. The pyrrolidones are not particularly limited insofar as it has a pyrrolidone skeleton and 2-pyrrolidone, N-alkyl-2-pyrrolidone, and 1-alkyl-2-pyrrolidone are mentioned, for example. Examples of the imidazolidinones include, for example, 1,3-dimethyl-2-imidazolidinone. Examples of the sulfoxides include, for example, dimethylsulfoxide. Examples of the lactones include, for example, γ-butyrolactone. Examples of the imidazoles include, for example, imidazole, 1-methylimidazole, 2-methylimidazole, and 1,2-dimethylimidazole.

Examples of the monoalcohol include, but are not particularly limited to, methanol, ethanol, n-propyl alcohol, iso-propyl alcohol, n-butanol, 2-butanol, tert-butanol, iso-butanol, n-pentanol, 2-pentanol, 3-pentanol, and tert-pentanol, for example.

Examples of the alkylpolyol include, but are not particularly limited to, glycerol, ethylene glycol, diethylene glycol, triethylene glycol, propylene glycol (1,2-propanediol), dipropylene glycol, trimethylolpropane, 1,3-propylene glycol (1,3-propanediol), isobutylene glycol (2-methyl-1,2-propanediol), 1,2-butanediol, 1,3-butanediol, 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, and 1,8-octanediol, for example.

It is more preferable for the organic solvent of this embodiment to contain one or two or more kinds selected from the group consisting of an alkyldiol compound having 2 to 6 carbon atoms and an alkyltriol compound having 2 to 6 carbon atoms except glycerol. The ink composition containing such an organic solvent tends to be more excellent in discharge stability and storage stability. The organic solvent is preferably a water-soluble substance. The water solubility means that, after water and the organic solvent are mixed with a mass ratio of 1:1 at normal temperature, and then the mixture is stirred, separation or cloudiness cannot be observed.

Examples of the glycol ether include, but are not particularly limited to, glycol diethers and glycol monoethers, for example.

Specific examples of the glycol diether include, but are not particularly limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethylether, dipropylene glycol dimethyl ether, and dipropylene glycol diethylether.

Ethylene glycol monomethyl ether, ethylene glycol monoethyl ether, ethylene glycol mono n-propyl ether, ethylene glycol monoisopropyl ether, ethylene glycol monobutyl ether, ethylene glycol monohexyl ether, ethylene glycol monophenylether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether are mentioned.

The content of the organic solvent is preferably 5.0% by mass or more and 50% by mass or less, more preferably 10% by mass or more and 30% by mass or less, and still more preferably 5.0% by mass or more and 20% by mass or less based on the total amount (100% by mass) of the ink composition. Due to the fact that the content of the organic solvent is 50% by mass or less, the drying characteristics of the ink composition adhering to a target recording medium tend to further improve. Due to the fact that the content of the organic solvent is within the ranges mentioned above, there is a tendency that a printed product more excellent in friction fastness can be obtained.

Crosslinking Agent

It is preferable for the ink composition of this embodiment to further contain a crosslinking agent. Due to the fact that a crosslinking agent is contained, the resin particles are crosslinked, and therefore there is a tendency that the abrasion resistance and the friction fastness of recorded matter to be obtained are more excellent. Moreover, the storage stability also tends to be excellent. The crosslinking agent is not particularly limited insofar as the resin particles can be crosslinked and, for example, a blocked isocyanate isocyanate-based compound is mentioned.

In the blocked isocyanate isocyanate-based compound, an active isocyanate group is protected with a blocking agent, and thus maintains the stability in a usual state. However, the blocking agent is dissociated by heat treatment, and then the active isocyanate group is regenerated, so that a crosslinking reaction occurs. Specific examples of such a crosslinking agent include Takenate WB-3021 manufactured by Mitsui Chemicals, Inc., Elastron BN-69 and 11 manufactured by Daiichi Kogyo Seiyaku Co., Ltd., SU-268A, NBP-8730, and NBP-211 manufactured by MEISEI CHEMICAL WORKS. LTD., and the like. The crosslinking agents may be used alone or in combination of two or more kinds thereof.

In addition, when a polymerizable unsaturated monomer contains (meth)acrylic acid, caobodiimide and oxazoline which are crosslinking agents reacting with carboxylic acid are usable. Examples of the caobodiimide include Carbodilite E-02 and E-03A manufactured by Nisshinbo Chemical Inc. Examples of the oxazoline include Epocros K-2010E, K-2020E, and K-2030E manufactured by NIPPON SHOKUBAI Co., Ltd.

The crosslinking agent contains the blocked isocyanate isocyanate-based compound in a proportion of preferably 0.04 part by mass or more and 1.0 part by mass or less, more preferably 0.05 part by mass or more and 0.5 part by mass or less, still more preferably 0.08 part by mass or more and 0.3 part by mass or less, and yet still more preferably 0.1 part by mass or more and 0.2 part by mass or less based on 1.0 part by mass of the pigment particles. Due to the fact that the content of the blocked isocyanate isocyanate-based compound is within the ranges mentioned above, there is a tendency that a printed product more excellent in friction fastness can be obtained.

In the ink composition, the content of the crosslinking agent is preferably 0.1% by mass or more and 10% by mass or less, more preferably 0.3% by mass or more and 3.0% by mass or less, and still more preferably 0.5% by mass or more and 1.5% by mass or less based on the total amount (100% by mass) of the ink composition. Due to the fact that the content of the crosslinking agent is within the ranges mentioned above, there is a tendency that a printed product more excellent in friction fastness can be obtained.

Lubricant

It is preferable for the ink composition of this embodiment to further contain a lubricant. Due to the fact that a lubricant is contained, there is a tendency that a printed product more excellent in friction fastness can be obtained.

Examples of the lubricant include, but are not particularly limited to, calcium stearate, ammonium stearate, microcrystal wax, polyethylene wax, and polyethylene paraffin wax. Examples of commercially-available items include Michem Emulsion 85250 (Trade Name, manufactured by Michelman), for example. Among the above, polyethylene-based compounds, such as polyethylene wax, polyethylene-paraffin wax, and Michem Emulsion 85250 (Trade Name, manufactured by Michelman) are more preferable. The lubricants may be used alone or in combination of two or more kinds thereof.

The lubricant contains the polyethylene-based compound in a proportion of preferably 0.05 part by mass or more and 1.0 part by mass or less, more preferably 0.08 part by mass or more and 0.5 part by mass or less, still more preferably 0.1 part by mass or more and 0.3 part by mass or less, and yet still more preferably 0.15 part by mass or more and 0.25 part by mass or less based on 1.0 part by mass of the pigment particles. Due to the fact that the content of the polyethylene-based compound is within the ranges mentioned above, there is a tendency that a printed product more excellent in friction fastness can be obtained.

In the ink composition, the content of the lubricant is preferably 0.1% by mass or more and 10% by mass or less, more preferably 0.3% by mass or more and 5.0% by mass or less, and still more preferably 0.5% by mass or more and 2.0% by mass or less based on the total amount (100% by mass) of the ink composition. Due to the fact that the content of the lubricant is within the ranges mentioned above, there is a tendency that a printed product more excellent in friction fastness can be obtained.

The weight average molecular weight of the lubricant is preferably less than 10,000, more preferably 1000 or more and 9000 or less, and still more preferably 2000 or more and 7000 or less.

Surfactant

It is preferable for the ink composition to further contain a surfactant from the viewpoint of glossiness. Examples of the surfactant include, but are not particularly limited to, an acetylene glycol-based surfactant, a fluorine-based surfactant, and a silicone-based surfactant, for example.

As the acetylene glycol-based surfactant, one or more kinds selected from 2,4,7,9-tetramethyl-5-decyne-4,7-diol and an alkylene oxide adduct of 2,4,7,9-tetramethyl-5-decyne-4,7-diol and 2,4-dimethyl-5-decyne-4-ol and an alkylene oxide adduct of 2,4-dimethyl-5-decyne-4-ol are preferable. Examples of commercially-available items of the acetylene glycol-based surfactant include, but are not particularly limited to, Olefin 104 series and E series, such as Olefin E1010 (Trade Names, manufactured by Air Products Japan, Inc.), and Surfynol 104, 465, and 61 and DF110D (Trade Names, manufactured by Nissin Chemical Industry CO., Ltd.), for example. The acetylene glycol-based surfactants may be used alone or in combination of two or more kinds thereof.

Examples of the fluorine-based surfactant include, but are not particularly limited to, perfluoroalkyl sulfonate, a perfluoroalkyl carboxylate salt, perfluoroalkyl phosphate ester, a perfluoroalkyl ethylene oxide adduct, perfluoroalkyl betaine, and a perfluoroalkyl amine oxide compound, for example. Examples of commercially-available items of the fluorine-based surfactant include, but are not particularly limited to, S-144 and S-145 (all Trade Names, manufactured by Asahi Glass Co., Ltd.); FC-170C, FC-430, and Fluorad FC4430 (all Trade Names, manufactured by Sumitomo 3M, Inc.); FSO, FSO-100, FSN, FSN-100, and FS-300 (all Trade Names, manufactured by Dupont); and FT-250 and 251 (all Trade Names, manufactured by Neos Co., Ltd.), for example. The fluorine-based surfactants may be used alone or in combination of two or more kinds thereof.

Examples of the silicone-based surfactant include, but are not particularly limited to, a polysiloxane-based compound and polyether-modified organosiloxane, for example. Commercially-available items of the silicone-based surfactant are not particularly limited and, specifically, SAG503A (Trade Name, manufactured by Nisshin Chemical Co., Ltd.), BYK-306, BYK-307, BYK-333, BYK-341, BYK-345, BYK-346, BYK-347, BYK-348, and BYK-349 (all Trade Names, manufactured by BYK Chemie), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all Trade Names, manufactured by Shin-Etsu Chemical Co., Ltd.), and the like are mentioned. The silicone-based surfactants may be used alone or in combination of two or more kinds thereof.

The content of the surfactant is preferably 0.05% by mass or more and 2.5% by mass or less and more preferably 0.05% by mass or more and 1.5% by mass or less based on the total amount (100% by mass) of the ink composition. Due to the fact that the content of the surfactant is within the ranges mentioned above, there is a tendency that the wettability of the ink composition adhering to a target recording medium further improves.

The ink composition can also contain, as appropriate, various additives, such as, a softening agent, wax, a dissolution assistant, a viscosity modifier, a pH adjuster, such as triisopropanolamine, a moisturizer, such as glycerol, an antioxidant, an antiseptic, an antifungal agent, a corrosion inhibitor, and a chelating agent (for example, sodium ethylenediamine tetraacetate) for capturing metal ions affecting dispersion as the other components. Among the above, glycerol and the like which are also organic solvents are also the organic solvents described above.

The ink composition of this embodiment is used for an ink jet printing method described later.

Ink Jet Printing Method

An ink jet printing method of this embodiment has a process of causing the ink composition of this embodiment to adhere to a target recording medium containing cloth (adhesion process). FIGURE is a flow chart illustrating an example of the printing method of this embodiment. As illustrated in FIGURE, the printing method of this embodiment may further have the following heating process and cleaning process in addition to the adhesion process.

The ink jet printing method is a printing method in which the ink composition is used by being charged into an ink jet apparatus. Examples of the ink jet apparatus include, but are not particularly limited to, a drop-on-demand type ink jet apparatus, for example. Examples of the drop-on-demand type ink jet apparatus include an apparatus employing an ink jet printing method using a piezoelectric element disposed in a head, an apparatus employing an ink jet printing method using thermal energy by a heater and the like of a heating resistance element disposed in a head, and the like and an apparatus employing any ink jet printing method may be used. Hereinafter, each process of the ink jet printing method is described in detail.

Adhesion Process

The adhesion process of this embodiment includes discharging the ink composition towards the surface (image formation region) of cloth which is a target recording medium by an ink jet system, and then causing the ink composition to adhere to the target recording medium to form an image, for example. The discharge conditions may be determined as appropriate depending on the physical properties of the ink composition to be discharged.

Heating Process

The printing method of this embodiment may further have a heating process of heating the target recording medium to which the ink composition adheres after the adhesion process. Due to the fact that the heating process is provided, a dye can more favorably dye fibers configuring the cloth. Examples of heating methods include, but are not particularly limited to, an HT method (high temperature steaming method), an HP method (high-pressure steaming method), and a thermosol method, for example.

In the heating process, pressurization treatment may be or may not be performed to the ink composition adhesion surface on the target recording medium. Examples of heating methods not performing pressurization treatment to the ink composition adhesion surface on the target recording medium include oven drying (methods not performing press, such as a conveyor oven, a batch oven, and the like). Due to the fact that such a heating process is provided, the recorded matter productivity further improves. Examples of heating methods performing pressurization treatment to the ink composition adhesion surface on the target recording medium include, but are not particularly limited to, heat press and wet-on-dry, for example. The "pressurization" refers to applying pressure to the target recording medium by bringing a solid into contact with the target recording medium.

The temperature in the heat treatment is preferably 130° C. or more and 180° C. or less, more preferably 140° C. or more and 175° C. or less, and still more preferably 150° C. or more and 170° C. or less. When the temperature in the heat treatment is within the ranges mentioned above, there is a tendency that fibers configuring the cloth can be more favorably dyed.

Cleaning Process

The printing method of this embodiment may further have a cleaning process of cleaning the target recording medium to which the ink composition adheres after the heating process. By the cleaning process, the pigments not dyeing the fibers can be effectively removed. The cleaning process can be performed using water, for example, and soaping treatment may be performed as necessary. As soaping treatment methods are not particularly limited, and more specifically, a method including washing out non-adhering pigments with a hot soap liquid or the like is mentioned, for example.

Thus, recorded matter, such as a printed product, in which an image originating from the ink composition is formed on the target recording medium containing cloth, can be obtained.

Target Recording Medium

The target recording medium of this embodiment may be one containing cloth (including cloth itself). Examples of the cloth include, but are not particularly limited to the following substances, natural fibers and synthetic fibers, such as silk, cotton, wool, nylon, polyester, and rayon, for example. The cloth may be one containing one kind of fibers or may be one obtained by blending two or more kinds of fibers. Among the above, by the use of one obtained by blending fibers different in permeability, there is a tendency that the effects of this embodiment are likely to be obtained. The cloth may be one obtained by forming the fibers mentioned above into forms, such as textiles, knit fabric, and nonwoven fabric.

EXAMPLES

Hereinafter, the invention is more specifically described with reference to Examples. The invention is not particularly limited at all by the following Examples.

Materials for Ink Compositions

Main materials for ink compositions used in the production of the following recorded matter are as follows.

Pigment Particles

C.I. Pigment Blue 15:3 (manufactured by Dainichiseika Color & Chemicals Mfg. Co., Ltd., Average particle diameter: 90 nm, Zeta potential: −54 mV, Abbreviated as "PB-15:3" in Tables.) Bonjetblack CW-1 (Trade Name, manufactured by Orient Chemical Industries Co., Ltd., Average particle diameter: 100 nm, Zeta potential: −51 mV) EMACOL SF Yellow J701F (Trade Name, manufactured by Sanyo Color Works, LTD., Average particle diameter: 110 nm, Zeta potential: −58 mV)

Resin Particles

UW-1501F (Trade Name, manufactured by Ube Industries, Ltd., Average particle diameter: 55 nm, Zeta potential: −55 mV) UW-5002 (Trade Name, manufactured by Ube Industries, Ltd., Average particle diameter: 32 nm, Zeta potential: −52 mV) W-6061 (Trade Name, manufactured by Mitsui Chemicals, Inc., Average particle diameter: 60 nm, Zeta potential: −50 mV) W-6110 (Trade Name, manufactured by Mitsui Chemicals, Inc., Average particle diameter: 60 nm, Zeta potential: −49 mV) UX-150 (Trade Name, manufactured by Sanyo Chemical Industries, Ltd., Average particle diameter: 72 nm, Zeta potential: −49 mV)

UX-390 (Trade Name, manufactured by Sanyo Chemical Industries, Ltd., Average particle diameter: 60 nm, Zeta potential: −58 mV)

UX-200 (Trade Name, manufactured by Sanyo Chemical Industries, Ltd., Average particle diameter: 72 nm, Zeta potential: −46 mV)

Resin A (Urethane resin, Average particle diameter: 155 nm, Zeta potential: −49 mV)

Resin B (Urethane resin, Average particle diameter: 68 nm, Zeta potential: −65 mV)

Crosslinking Agent

Takenate WB-3021 (Trade Name, manufactured by Mitsui Chemicals, Inc.)

Organic Solvent

Triethylene glycol monobutyl ether (manufactured by Tokyo Kasei Kogyo Co., Ltd., Abbreviated as "TEGmBE" in Tables) 1,3-propanediol (manufactured by Tokyo Kasei Kogyo Co., Ltd.)

Trimethylolethane (manufactured by Tokyo Kasei Kogyo Co., Ltd.)

Lubricant

Michem Emulsion 85250 (Trade Name, manufactured by Michelman)

Moisturizer

Glycerol

Surfactant

SAG503A (Trade Name, manufactured by Nisshin Chemical Co., Ltd.)

PH Adjuster

Triisopropanolamine (Abbreviated as "TIPA" in Tables)

Antiseptic

Proxel XL2 (Trade Name, manufactured by Arch Chemicals)

Water

Pure Water

Preparation of Resin A and Resin B

A resin A and a resin B were prepared using a known urethane synthesizing method. Specifically, the resin A and the resin B were prepared by adjusting the zeta potentials to the zeta potentials mentioned above by the used amount of carboxyl group containing monomers used for the synthesis, and then adjusting the average particle diameters to the average particle diameters mentioned above by adjusting the time and the amount of an emulsifier in a dispersion process.

Preparation of Ink Composition

Materials were mixed according to the composition shown in the following Table 1, and then sufficiently stirred to give each ink composition. In the following Table 1, the unit of the numerical value is % by mass, the numerical value is the solid content concentration, and the total is 100.0% by mass.

TABLE 1

| | Pigment particles | | Resin particles | | Crosslinking agent | | Lubricant | |
|---|---|---|---|---|---|---|---|---|
| | Type | Content | Type | Content | Type | Content | Type | Content |
| Example 1 | PB-15:3 | 3.7 | UW-1501F | 10 | Takenate WB-3021 | 1 | Michem Emulsion 85250 | 2 |
| Example 2 | PB-15:3 | 3.7 | UW-1501F | 10 | Takenate WB-3021 | 1 | Michem Emulsion 85250 | 2 |
| Example 3 | PB-15:3 | 3.7 | UW-1501F | 10 | Takenate WB-3021 | 1 | Michem Emulsion 85250 | 2 |
| Example 4 | Bonjetblack CW-1 | 6 | W-6061 | 11 | Takenate WB-3021 | 0.5 | Michem Emulsion 85250 | 0.5 |
| Example 5 | Bonjetblack CW-1 | 6 | W-6110 | 8 | Takenate WB-3021 | 1 | Michem Emulsion 85250 | 1 |

TABLE 1-continued

| | | | | | | | | |
|---|---|---|---|---|---|---|---|---|
| Example 6 | PB-15:3 | 3.7 | UX-150 | 10 | Takenate WB-3021 | 0.8 | Michem Emulsion 85250 | 0.8 |
| Comp. Ex. 1 | EMACOL SF Yellow J701F | 3.5 | UW-5002 | 15 | Takenate WB-3021 | 1.3 | Michem Emulsion 85250 | 1.5 |
| Example 7 | Bonjetblack CW-1 | 6 | UX-390 | 6 | Takenate WB-3021 | 1 | Michem Emulsion 85250 | 1 |
| Comp. Ex. 2 | EMACOL SF Yellow J701F | 3.5 | UX-200 | 13 | Takenate WB-3021 | 1 | Michem Emulsion 85250 | 1 |
| Example 8 | PB-15:3 | 3.7 | UX-150 | 20 | Takenate WB-3021 | 0.8 | Michem Emulsion 85250 | 0.8 |
| Example 9 | PB-15:3 | 3.7 | UW-1501F | 3.7 | Takenate WB-3021 | 0.5 | Michem Emulsion 85250 | 0.5 |
| Example 10 | Bonjetblack CW-1 | 3.7 | UX-200 | 10 | Takenate WB-3021 | 0.5 | Michem Emulsion 85250 | 0.5 |
| Comp. Ex. 3 | PB-15:3 | 3.7 | Resin A | 10 | Takenate WB-3021 | 0.5 | Michem Emulsion 85250 | 0.5 |
| Comp. Ex. 4 | Bonjetblack CW-1 | 3.7 | Resin B | 10 | Takenate WB-3021 | 0.5 | Michem Emulsion 85250 | 0.5 |
| Example 12 | EMACOL SF Yellow J701F | 3.7 | Resin B | 10 | Takenate WB-3021 | 0.5 | Michem Emulsion 85250 | 0.5 |
| Example 13 | EMACOL SF Yellow J701F | 3.7 | Resin A | 10 | Takenate WB-3021 | 0.5 | Michem Emulsion 85250 | 0.5 |

| | Organic solvent | | Other components | |
|---|---|---|---|---|
| | Type | Content | Moisturizer/Surfactant/ pH adjuster/Antiseptic/Pure water | Content |
| Example 1 | TEGmBE | 3 | Glycerol/SAG503A/ TIPA/Proxel XL2/Pure water | 12/0.5/ 1/0.3/Balance |
| Example 2 | 1,3-propanediol | 3 | Glycerol/SAG503A/ TIPA/Proxel XL2/Pure water | 12/0.5/ 1/0.3/Balance |
| Example 3 | Trimethylolethane | 3 | Glycerol/SAG503A/ TIPA/Proxel XL2/Pure water | 12/0.5/ 1/0.3/Balance |
| Example 4 | TEGmBE | 3 | Glycerol/SAG503A/ TIPA/Proxel XL2/Pure water | 12/0.5/ 1/0.3/Balance |
| Example 5 | TEGmBE | 3 | Glycerol/SAG503A/ TIPA/Proxel XL2/Pure water | 12/0.5/ 1/0.3/Balance |
| Example 6 | TEGmBE | 3 | Glycerol/SAG503A/ TIPA/Proxel XL2/Pure water | 12/0.5/ 1/0.3/Balance |
| Comp. Ex. 1 | TEGmBE | 3 | Glycerol/SAG503A/ TIPA/Proxel XL2/Pure water | 12/0.5/ 1/0.3/Balance |
| Example 7 | TEGmBE | 3 | Glycerol/SAG503A/ TIPA/Proxel XL2/Pure water | 12/0.5/ 1/0.3/Balance |
| Comp. Ex. 2 | TEGmBE | 3 | Glycerol/SAG503A/ TIPA/Proxel XL2/Pure water | 12/0.5/ 1/0.3/Balance |
| Example 8 | TEGmBE | 3 | Glycerol/SAG503A/ TIPA/Proxel XL2/Pure water | 12/0.5/ 1/0.3/Balance |
| Example 9 | TEGmBE | 3 | Glycerol/SAG503A/ TIPA/Proxel XL2/Pure water | 6/0.5/ 1/0.3/Balance |
| Example 10 | TEGmBE | 3 | Glycerol/SAG503A/ TIPA/Proxel XL2/Pure water | 6/0.5/ 1/0.3/Balance |
| Comp. Ex. 3 | TEGmBE | 3 | Glycerol/SAG503A/ TIPA/Proxel XL2/Pure water | 6/0.5/ 1/0.3/Balance |
| Comp. Ex. 4 | TEGmBE | 3 | Glycerol/SAG503A/ TIPA/Proxel XL2/Pure water | 6/0.5/ 1/0.3/Balance |
| Example 12 | TEGmBE | 3 | Glycerol/SAG503A/ TIPA/Proxel XL2/Pure water | 6/0.5/ 1/0.3/Balance |
| Example 13 | TEGmBE | 3 | Glycerol/SAG503A/ TIPA/Proxel XL2/Pure water | 6/0.5/ 1/0.3/Balance |

Surface Tension

The surface tension [mN/m] of each of the prepared ink compositions was determined by measuring the static surface tension at 25° C. by a Wilhelmy method using a surface tension meter (Trade Name "CBVP-Z", manufactured by Kyowa Interface Science Co., LTD.).

Viscosity

The viscosity [mPa·s] of each of the prepared ink compositions was determined by measuring the viscosity at 20° C. with a viscometer (manufactured by Physica, Trade Name "MCR-300") using a cone (Diameter of 75 mm, Angle of 1°) by setting the rotation speed to 100 rpm.

Production of Coating Film Sample

A frame was provided with silicone rubber (Thickness: 5 mm) on a stainless steel (SUS) flat plate, and then 10 g of each of the ink compositions prepared above was placed in a 3 cm×19 cm opening portion, followed by drying under the atmosphere overnight. Thereafter, the resultant substance was heat treated at 160° C. for 15 minutes, whereby a coating film on the SUS was obtained. Furthermore, the coating film was peeled from the SUS, so that the coating film was obtained.

Young's Modulus

The obtained coating film was measured for a stress-distortion curve using a TENSILON universal tester (Trade Name: RTG-1250, manufactured by A&D Company, Limited) under the conditions where the test piece sizes were 10 mm in width and 30 mm in height and the tensile speed was 100 mm/min. The Young's modulus [MPa] was determined by the linear regression between 0.05 to 0.25% of the distortion of the stress-distortion curve. The film thickness of the coating film required for this measurement was determined from the actual measurement by a micrometer (Trade Name "MDH-25M", manufactured by Mitsutoyo Corporation).

Fracture Elongation

The fracture elongation (%) of the test piece was measured using a TENSILON universal tester (Trade Name: RTG-1250, manufactured by A&D Company, Limited) in the same manner as in the measurement of [Young's modulus] above.

The physical properties of the ink compositions obtained above are shown in the following table 2. The "particle diameter ratio" and the "zeta potential ratio" in Table 2 are calculated values from the average particle diameters and the zeta potentials of the pigment particles and the resin particles used for the ink compositions. The average particle diameter and the zeta potential of the pigment particles and the resin particles each were individually measured by the methods described above.

speed was adjusted to the values shown below with an ink jet discharge observation device "Dot View" (Trade Name, manufactured by Trytech Co., Ltd.), nozzle omission and curved flight were observed, and then the discharge stability was evaluated according to the following evaluation criteria. The results are shown in Table 3.

Evaluation Criteria

5: Nozzles in which the nozzle omission and the curved flight occurred cannot be observed at the discharge speed of m/s and nozzles in which the nozzle omission and the curved flight occurred cannot be observed at the discharge speed of 7 m/s.

4: Nozzles in which the nozzle omission and the curved flight occurred cannot be observed at the discharge speed of m/s and nozzles in which the nozzle omission and the curved flight occurred can be observed in a proportion of more than 0% and 3% or less based on all the nozzles at the discharge speed of 7 m/s.

3: Nozzles in which the nozzle omission and the curved flight occurred cannot be observed at the discharge speed of m/s and nozzles in which the nozzle omission and the curved flight occurred can be observed in a proportion of more than 3% based on all the nozzles at the discharge speed of 7 m/s.

TABLE 2

| | Ink composition | | | | | | | | | |
|---|---|---|---|---|---|---|---|---|---|---|
| | Pigment | | Resin | | Particle diameter ratio (Average particle diameter of resin particles/ Average particle diameter of pigment particles) | Zeta potential ratio (Zeta potential of resin particles/Zeta potential of pigment particles) | Surface tension (mN/m) | Viscosity (mPa · S) | Coating film | |
| | Average particle diameter (nm) | Zeta potential (mV) | Average particle diameter (nm) | Zeta potential (mV) | | | | | Young's modulus (MPa) | Fracture elongation (%) |
| Example 1 | 90 | −54 | 55 | −55 | 0.61 | 1.02 | 42.8 | 9.4 | 24.4 | 648 |
| Example 2 | 90 | −54 | 55 | −55 | 0.61 | 1.02 | 42.8 | 9.4 | 24.4 | 648 |
| Example 3 | 90 | −54 | 55 | −55 | 0.61 | 1.02 | 42.8 | 9.4 | 24.4 | 648 |
| Example 4 | 100 | −51 | 60 | −50 | 0.60 | 0.98 | 42.8 | 9.7 | 5.0 | 1101 |
| Example 5 | 100 | −51 | 60 | −49 | 0.60 | 0.96 | 42.8 | 9.7 | 4.0 | 1101 |
| Example 6 | 90 | −54 | 72 | −49 | 0.80 | 0.91 | 40.9 | 12.1 | 1.0 | 1101 |
| Comp. Ex. 1 | 110 | −58 | 32 | −52 | 0.29 | 0.90 | 43.7 | 13.1 | 40.7 | 696 |
| Example 7 | 100 | −51 | 60 | −58 | 0.60 | 1.15 | 44.8 | 9.3 | 24.6 | 576 |
| Comp. Ex. 2 | 110 | −58 | 72 | −46 | 0.66 | 0.79 | 38.2 | 21.2 | 0.1 | 1202 |
| Example 8 | 90 | −54 | 72 | −49 | 0.80 | 0.91 | 40.9 | 26.0 | 1.0 | 1101 |
| Example 9 | 90 | −54 | 55 | −55 | 0.61 | 1.02 | 42.8 | 4.5 | 24.4 | 648 |
| Example 10 | 100 | −51 | 72 | −46 | 0.72 | 0.90 | 38.2 | 21.2 | 0.5 | 1100 |
| Comp. Ex. 3 | 90 | −54 | 155 | −49 | 1.72 | 0.91 | 43.4 | 5.9 | 6.0 | 550 |
| Comp. Ex. 4 | 100 | −51 | 68 | −65 | 0.68 | 1.27 | 45.8 | 7.2 | 12.4 | 450 |
| Example 11 | 110 | −58 | 68 | −65 | 0.62 | 1.12 | 45.8 | 7.0 | 12.4 | 500 |
| Example 12 | 110 | −58 | 155 | −49 | 1.41 | 0.84 | 43.4 | 5.9 | 6.0 | 650 |

Discharge Stability

Each ink composition prepared above was charged into an ink cartridge of an ink jet printer (manufactured by Seiko Epson Corp., Product name "PX-G930"), the ink discharge 2: Nozzles in which the nozzle omission and the curved flight occurred can be observed in a proportion of more than 0% and 3% or less based on all the nozzles at the discharge speed of 7 m/s.

1: Nozzles in which the nozzle omission and the curved flight occurred can be observed in a proportion of more than 3% based on all the nozzles at the discharge speed of 7 m/s.

Storage Stability

Each ink composition prepared above was placed in a glass bottle of a 50 cc container, and then tightly sealed. Thereafter, the glass bottle was placed in a 60° C. thermostat. After allowed to stand for 7 days, the glass bottle was taken out, and then sufficiently cooled to room temperature. Then, the viscosity was measured in the same manner as in the measurement of [Viscosity] above. The increase rate of the viscosity after allowed to stand for 7 days to the initial viscosity obtained by the measurement of [Viscosity] was calculated, and then the storage stability was evaluated according to the following evaluation criteria. The results are shown in Table 3.

Evaluation Criteria

5: The viscosity increase rate is less than 3.0%.
4: The viscosity increase rate is 3.0% or more and less than 5.0%.
3: The viscosity increase rate is 5.0% or more and less than 10%.
2: The viscosity increase rate is 10% or more and less than 15%.
1: The viscosity increase rate is 15% or more.

Production of Printed Product

Each ink composition prepared above was caused to adhere to cloth by an ink jet method using a converted machine (having a cloth fixing unit so as to enable recording on cloth) of an ink jet printer (manufactured by Seiko Epson Corp., Product Name "PX-G930"). As the recording conditions, a solid pattern image was recorded with an adhesion amount of 15 mg/inch$^2$. Thus, ink jet printing was performed. Herein, the "solid pattern image" means an image in which dots were recorded to all the pixels, the pixel which is the minimum recording unit region specified by the recording resolution.

Thereafter, heat treatment was performed at 160° C. for 1 minute using a heat press machine, so that the ink composition was fixed to a target recording medium. Thus, a printed product in which an image was formed (ink was printed) on the target recording medium was manufactured.

Friction Fastness

Each printed product was subjected to rubbing back and forth by 100 times using a Gakushin-type friction fastness tester AB-301 (Trade Name, manufactured by TESTER SANGYO CO., LTD.) under the conditions of a 200 g load and a speed of 10 cm/s, a dye migration concentration OD value was measured using a white cloth for JIS color fastness test (No. 3-1 according to JIS L 0803), and then the friction fastness was evaluated according to the following evaluation criteria. The results are shown in Table 3. The lower dye migration concentration OD value means that the friction fastness is more excellent.

Evaluation Criteria

5: The dye migration concentration OD value is 0.15 or less.
4: The dye migration concentration OD value is more than 0.15 and 0.20 or less.
3: The dye migration concentration OD value is more than 0.20 and 0.25 or less.
2: The dye migration concentration OD value is more than 0.25 and 0.30 or less.
1: The dye migration concentration OD value is more than 0.30.

TABLE 3

| | Evaluation items | | |
|---|---|---|---|
| | Friction fastness | Discharge stability | Storage stability |
| Example 1 | 5 | 4 | 4 |
| Example 2 | 5 | 5 | 5 |
| Example 3 | 5 | 5 | 5 |
| Example 4 | 5 | 4 | 4 |
| Example 5 | 5 | 4 | 4 |
| Example 6 | 5 | 4 | 4 |
| Comp. Ex. 1 | 1 | 2 | 1 |
| Example 7 | 2 | 1 | 3 |
| Comp. Ex. 2 | 1 | 2 | 2 |
| Example 8 | 3 | 1 | 2 |
| Example 9 | 2 | 4 | 4 |
| Example 10 | 5 | 4 | 4 |
| Comp. Ex. 3 | 1 | 1 | 1 |
| Comp. Ex. 4 | 1 | 2 | 2 |
| Example 11 | 2 | 4 | 4 |
| Example 12 | 2 | 4 | 4 |

The evaluation results above showed that the ink jet printing ink compositions of Examples were excellent in friction fastness. Furthermore, some examples were excellent also in discharge stability or storage stability. On the other hand, it was found that the ink jet printing ink compositions of Comparative Examples had poor friction fastness.

The entire disclosure of Japanese Patent Application No. 2017-027770, filed Feb. 17, 2017 is expressly incorporated by reference herein.

What is claimed is:

1. An ink jet printing ink composition comprising:
   pigment particles;
   resin particles; and
   water, wherein
   a particle diameter ratio of an average particle diameter of the resin particles to an average particle diameter of the pigment particles is 0.60 or more and 1.70 or less, and
   a potential ratio of a zeta potential of the resin particles to a zeta potential of the pigment particles is 0.80 or more and 1.25 or less.

2. The ink jet printing ink composition according to claim 1, wherein
   a Young's modulus of a coating film obtained by drying the ink jet printing ink composition is 0.5 MPa or more and 30 MPa or less, and
   fracture elongation of the coating film is 300% or more and 1200% or less.

3. The ink jet printing ink composition according to claim 1, wherein
   surface tension is 20 mN/m or more and 50 mN/m or less, and
   viscosity is 5.0 mPa·s or more and 25 mPa·s or less.

4. The ink jet printing ink composition according to claim 1, wherein
   the resin particles contain 1.0 part by mass or more and 5.0 parts by mass or less of a urethane-based resin based on 1.0 part by mass of the pigment particles.

5. The ink jet printing ink composition according to claim 1, further comprising:
   a crosslinking agent, wherein
   the crosslinking agent contains 0.04 part by mass or more and 1.0 part by mass or less of a block isocyanate-based compound based on 1.0 part by mass of the pigment particles.

6. The ink jet printing ink composition according to claim 1, further comprising:
a lubricant, wherein
the lubricant contains 0.05 part by mass or more and 1.0 part by mass or less of a polyethylene-based compound based on 1.0 part by mass of the pigment particles.

7. The ink jet printing ink composition according to claim 1, wherein
a content of the resin particles is 5.0% by mass or more and 20% by mass or less based on a total amount of the ink jet printing ink composition.

8. The ink jet printing ink composition according to claim 1, wherein
a content of the pigment particles is 1.0% by mass or more and 15% by mass or less based on the total amount of the ink jet printing ink composition.

9. The ink jet printing ink composition according to claim 1, wherein
the average particle diameter of the pigment particles and the average particle diameter of the resin particles each independently are 50 nm or more and 300 nm or less.

10. The ink jet printing ink composition according to claim 1, wherein
the zeta potential of the pigment particles and the zeta potential of the resin particles each independently are 40 mV or more in terms of an absolute value and mutually have a same sign.

11. The ink jet printing ink composition according to claim 1, further comprising:
an organic solvent, wherein
the organic solvent contains one or two or more kinds selected from the group consisting of an alkyldiol compound having 2 to 6 carbon atoms and an alkyltriol compound having 2 to 6 carbon atoms except glycerol.

12. The ink jet printing ink composition according to claim 1, wherein
the particle diameter ratio of the average particle diameter of the resin particles to the average particle diameter of the pigment particles is 0.60 or more and 0.90 or less.

13. An ink jet printing method comprising:
causing the ink composition according to claim 1 to adhere to a target recording medium containing cloth.

14. An ink jet printing method comprising:
causing the ink composition according to claim 2 to adhere to a target recording medium containing cloth.

15. An ink jet printing method comprising:
causing the ink composition according to claim 3 to adhere to a target recording medium containing cloth.

16. An ink jet printing method comprising:
causing the ink composition according to claim 4 to adhere to a target recording medium containing cloth.

17. An ink jet printing method comprising:
causing the ink composition according to claim 5 to adhere to a target recording medium containing cloth.

18. An ink jet printing method comprising:
causing the ink composition according to claim 6 to adhere to a target recording medium containing cloth.

19. An ink jet printing method comprising:
causing the ink composition according to claim 7 to adhere to a target recording medium containing cloth.

20. An ink jet printing method comprising:
causing the ink composition according to claim 8 to adhere to a target recording medium containing cloth.

* * * * *